E. H. FRENCH.
METHOD OF MAKING DRY SOLUBLE LIME SULPHUR COMPOSITION.
APPLICATION FILED AUG. 11, 1919.
1,423,605.
Patented July 25, 1922.
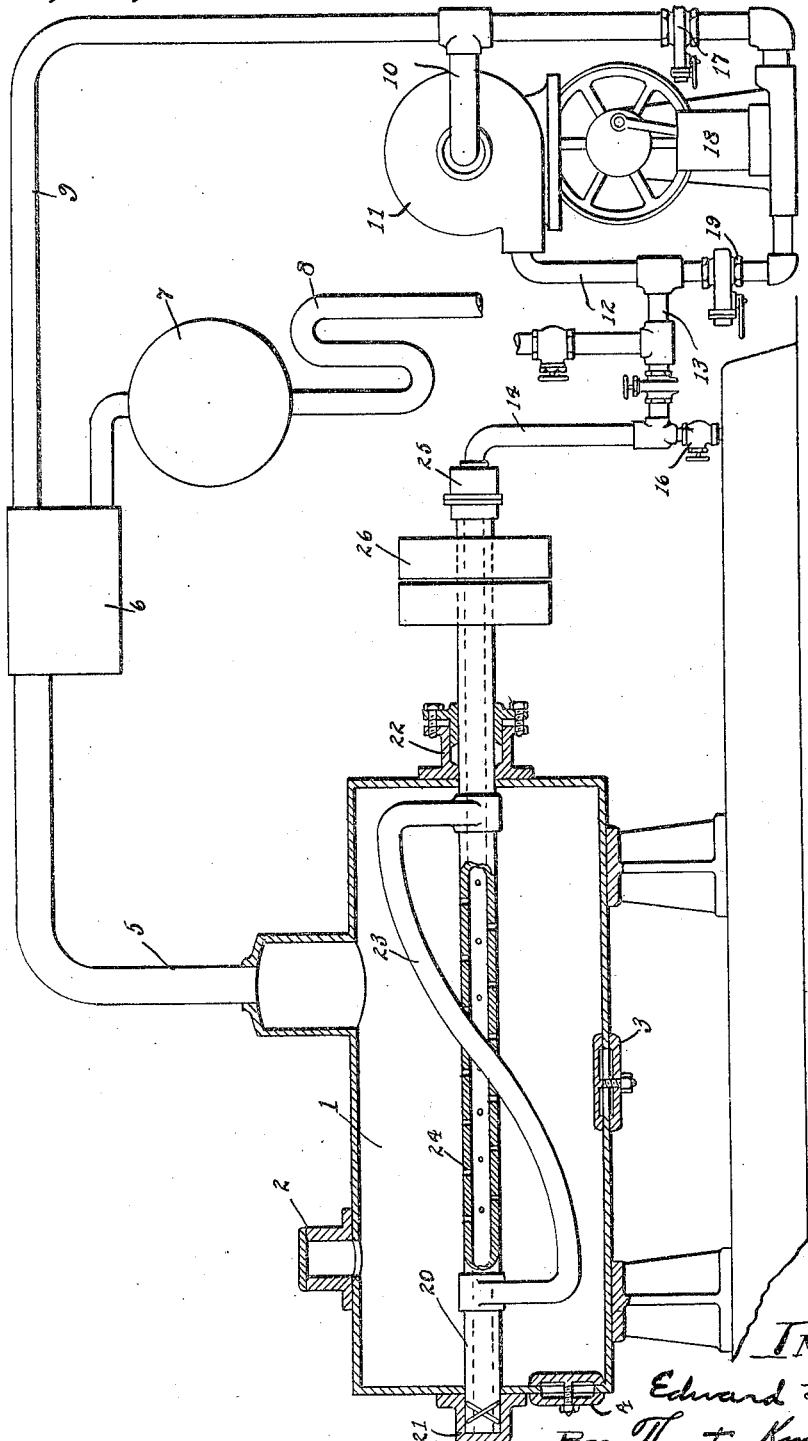
INVENTOR
Edward H French
By Thurston, Kwis & Hudson
Atty's

UNITED STATES PATENT OFFICE.

EDWARD H. FRENCH, OF COLUMBUS, OHIO.

METHOD OF MAKING DRY SOLUBLE LIME-SULPHUR COMPOSITION.

1,423,605.   Specification of Letters Patent.   Patented July 25, 1922.

Application filed August 11, 1919. Serial No. 316,615.

*To all whom it may concern:*

Be it known that I, EDWARD H. FRENCH, a citizen of the United States, residing at Columbus, in the county of Franklin and State of Ohio, have invented a certain new and useful Improvement in Methods of Making Dry Soluble Lime-Sulphur Composition, of which the following is a full, clear, and exact description.

The present invention relates to a method of commercially preparing concentrated or dry lime-sulphur composition.

One of the purposes of the invention is to provide commercial lime-sulphur composition, which is substantially entirely soluble in water by a method which prevents decomposition of the calcium poly-sulphide during the process of reducing it to concentrated or dry condition.

A further object of the invention is to provide a method for the purpose, wherein a solution of calcium poly-sulphide is evaporated under conditions which exclude air, which condition may be attained by evaporation in the presence of an inert or reducing gas.

Further objects of the invention will appear as the description proceeds.

Reference should be had to accompanying drawings forming a part of this specification in which Fig. 1 shows in elevation with parts in section one form of apparatus which may be employed in carrying out the herein described process.

The well known and generally recognized method of preparing a lime-sulphur solution is by digesting sulphur and calcium hydroxide with water at a boiling temperature. Under these conditions the reaction between the calcium hydroxide and sulphur proceeds thereby forming a poly-sulphide of calcium and usually some calcium thio-sulphate. This latter substance is present only in small quantity and has no deleterious action.

So long as the poly-sulphide remains in solution, it is quite stable but when the solution is evaporated to concentrated form or to a dry state, as is required in shipping the product commercially, decomposition of the poly-sulphide takes place, with the formation of free sulphur, giving a resultant mixture which contains a large percentage of insoluble material thereby greatly depreciating its value as an insecticide and fungicide spray.

I have discovered that the presence of air when the lime-sulphur solution is being evaporated to concentrated or dry form, has considerable to do with the decomposition of the poly-sulphide, probably due to the formation of hydrogen sulphide which in turn reacts upon the calcium poly-sulphide producing as a result free sulphur. This reaction may be empirically stated as follows:—

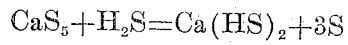
$$CaS_5 + H_2S = Ca(HS)_2 + 3S$$

Decomposition also may be due to processes of oxidization.

The present invention therefore may be broadly stated as comprising the method or process of preparing soluble concentrated or dry calcium poly-sulphide by evaporating the prepared poly-sulphide solution under conditions which insure the absence of air or other oxidizing conditions.

This condition may be fulfilled by evaporating the poly-sulphide solution in vacuo or by excluding the air through the presence of an inert or reducing gas which in the claims I have termed a nonoxidizing gas.

In proceeding to practice the process a filtered or settled-lime-sulphur solution made in the usual, or any desired manner, is placed in a suitable apparatus where it may be subjected to the heating operation. The lime-sulphur solution is preferably of a density corresponding to 33° to 35° Baumé.

Air is completely exhausted from the apparatus and inert gas or reducing gas is introduced into the apparatus. I have found that illuminating gas is a very satisfactory gas for the purpose. The evaporation of the lime-sulphur solution is continued in the presence of the inert gas.

In the accompanying drawing there is indicated an apparatus by which the process may be carried into effect, although the particular apparatus shown forms but one form of apparatus which may be used and as will be appreciated, other modes of applying the principal of the invention may be employed with equal facility.

A suitable receptacle or container is indicated at 1. This being provided with a suitable covered inlet 2 and a covered outlet 3. The container 1 may also have at the end thereof a covered manhole 4 which also serves as a means for extracting the dried contents of the tank after evaporation.

The container 1 is connected with a pipe 5 which leads to a condenser 6. This condenser may be of any desired type. The condenser is connected with a tank 7 which has an outlet pipe 8.

Leading from the condenser 6 is a pipe 9 which communicates with a pipe 10 which in turn is connected with a fan or blower 11. The casing for the blower 11 connects with a pipe 12 which in turn connects with a valve pipe 13, which pipe 13 connects with another pipe 14. The pipe 14 is directly connected to a valve gas pipe 16.

The pipe 9 extends below the pipe 10 and is provided with a shut-off valve 17. This pipe connects with a vacuum pump such as indicated at 18 and this pump is also connected by a valved pipe 19, with the pipe 13.

Within the container 1 there is a hollow shaft 20 which at one end is journaled in a suitable bearing 21 and at the opposite end extends through a stuffing box, 22. This shaft has mounted thereon a suitable stirring device 23. The shaft 20 is hollow and is provided with a plurality of outlets, such as indicated at 24. The shaft 24, as before stated, extends through the stuffing box 22 and by a suitable connection, of any desired type such as indicated at 25, is connected with the pipe 14. The hollow shaft 24 is suitably driven by a pulley such as indicated at 26.

In operation, a suitable quantity of lime-sulphur solution is placed within the receptacle 1 and the receptacle is heated in any desired manner, preferably by introducing steam in a jacket surrounding the receptacle 1.

The valves 17 and 19 are opened and the vacuum pump 18 is operated for the purpose of exhausting the air from the system. When this is accomplished the valved pipe 16 is opened, thereby to admit gas to the pipe 14 and simultaneously the fan or blower 11 is started thereby to create a circulation of the gas through the system.

The gas as it passes from the hollow shaft 24 of course fills all the space of the container 1 not occupied by the poly-sulphide solution and the gas mingles with the vapor produced by heating the poly-sulphide solution, passes through the pipe 5 and to the condenser 6. In the condenser the water is separated from the gas, the gas passing through the pipe 9 and to the blower 11. The moisture collected within the condenser passes to the tank 7 and through the exit pipe 8. The exit pipe is provided with a bend or fold in it so as to maintain a water seal thereby preventing the introduction of air to the system.

The evaporation of the poly-sulphide solution is continued in the presence of the circulating inert or reducing gas until the desired degree of concentration or dryness is obtained.

The blower which causes the circulation of the gas is preferably operated at such a speed as to produce a comparatively low pressure within the container 1, so as not in any way to retard the evaporation of the solution which is within the container 1.

I find that the product after being dried is very stable when it is again subjected to the air and is substantially entirely soluble in water and remains so under usual conditions incident to shipping and sale of the product.

The process which is herein disclosed may also be effectually performed or carried out by spraying a lime-sulphur solution into a heated chamber in the presence of an inert or reducing gas. Under such an arrangement, provision is of course made for the removal of the moisture evaporated from the solution and preferably the reducing or inert gas is circulated through the heated chamber under a low pressure.

Having described my invention, I claim—

1. The method of preparing soluble lime-sulphur which consists in evaporating a lime-sulphur solution in an atmosphere of nonoxidizing gas.

2. The method of preparing soluble lime-sulphur which consists in evaporating a lime-sulphur solution in an atmosphere of nonoxidizing gas under low pressure.

3. The method of preparing soluble lime-sulphur which consists in introducing a lime-sulphur solution into a suitably closed container, displacing the air in said container with a nonoxidizing gas and evaporating the lime-sulphur solution.

4. The method of preparing soluble lime-sulphur which consists in introducing a lime-sulphur solution into a closed container, exhausting the air from said container and introducing an atmosphere of nonoxidizing gas and circulating the same through the container under low pressure and evaporating.

In testimony whereof, I hereunto affix my signature.

EDWARD H. FRENCH.